US010468975B2

United States Patent
Yang et al.

(10) Patent No.: US 10,468,975 B2
(45) Date of Patent: Nov. 5, 2019

(54) FLYBACK CONVERTER, ACTIVE CLAMP CONTROL CIRCUIT AND ACTIVE CLAMP CONTROL METHOD

(71) Applicant: Silergy Semiconductor Technology (Hangzhou) LTD, Hangzhou, ZheJiang Province (CN)

(72) Inventors: Xiangdong Yang, Hangzhou (CN); Yongjiang Bai, Hangzhou (CN); Zhiliang Hu, Hangzhou (CN); Wei Chen, Saratoga, CA (US)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/020,365

(22) Filed: Jun. 27, 2018

(65) Prior Publication Data

US 2019/0036446 A1    Jan. 31, 2019

(30) Foreign Application Priority Data

Jul. 31, 2017    (CN) .......................... 2017 1 0639663

(51) Int. Cl.
  *H02M 3/335*    (2006.01)
  *H02M 1/34*    (2007.01)
  *H02M 1/00*    (2006.01)
(52) U.S. Cl.
  CPC ......... *H02M 1/34* (2013.01); *H02M 3/33569* (2013.01); *H02M 2001/0009* (2013.01); *H02M 2001/0051* (2013.01); *H02M 2001/0054* (2013.01); *H02M 2001/342* (2013.01)

(58) Field of Classification Search
  CPC ........... H02M 1/38; H02M 2001/0009; H02M 3/335–33592
  See application file for complete search history.

(56) References Cited

U.S. PATENT DOCUMENTS

| | | | |
|---|---|---|---|
| 6,069,803 A * | 5/2000 | Cross | ................ H02M 3/33569 363/21.14 |
| 8,310,846 B2 | 11/2012 | Piazzesi | |
| 8,587,964 B2 | 11/2013 | Yang et al. | |
| 8,803,563 B2 | 8/2014 | Deng et al. | |
| 8,868,249 B2 | 10/2014 | Li | |
| 8,917,068 B2 | 12/2014 | Chen et al. | |
| 9,444,321 B2 | 9/2016 | Xu et al. | |

(Continued)

FOREIGN PATENT DOCUMENTS

CN    101572490 A    11/2009

*Primary Examiner* — Fred E Finch, III
*Assistant Examiner* — Rafael O. De León Domenech
(74) *Attorney, Agent, or Firm* — Michael C. Stephens, Jr.

(57) ABSTRACT

An active clamp control circuit for a flyback converter can be configured to: control turn-on states of a main switch and an auxiliary switch to make the auxiliary switch turn on for a first time period in at least one switching period, and to make the main switch turn on for a second time period in each switching period, where the first and second time periods are non-overlapping periods of the switching period; and compare a peak value of an inductor current flowing through the main switch against a first threshold to adjust the first time period of the auxiliary switch when the peak value of the inductor current is greater than or equal to the first threshold, such that the first time period is directly proportional to the peak value of the inductor current.

20 Claims, 9 Drawing Sheets

(56) References Cited

U.S. PATENT DOCUMENTS

| | | |
|---|---|---|
| 2007/0121351 A1 | 5/2007 | Zhang et al. |
| 2008/0094047 A1 | 4/2008 | Huynh et al. |
| 2012/0257421 A1 | 10/2012 | Brkovic |
| 2013/0329463 A1 | 12/2013 | Chen |
| 2015/0311810 A1* | 10/2015 | Chen .................. H02M 3/33523 363/21.13 |
| 2016/0126853 A1* | 5/2016 | Davila .............. H02M 3/33592 363/21.14 |
| 2017/0070152 A1* | 3/2017 | Liu .................... H02M 3/33515 |
| 2018/0294734 A1* | 10/2018 | Song .................. H02M 3/33592 |
| 2018/0358902 A1* | 12/2018 | Duvnjak ........... H02M 3/33592 |

* cited by examiner

US 10,468,975 B2

FLYBACK CONVERTER, ACTIVE CLAMP CONTROL CIRCUIT AND ACTIVE CLAMP CONTROL METHOD

RELATED APPLICATIONS

This application claims the benefit of Chinese Patent Application No. 201710639663.1, filed on Jul. 31, 2017, which is incorporated herein by reference in its entirety.

FIELD OF THE INVENTION

The present invention generally relates to the field of power electronics, and more particularly to flyback converters, and active clamp control circuits and methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Figure 1:
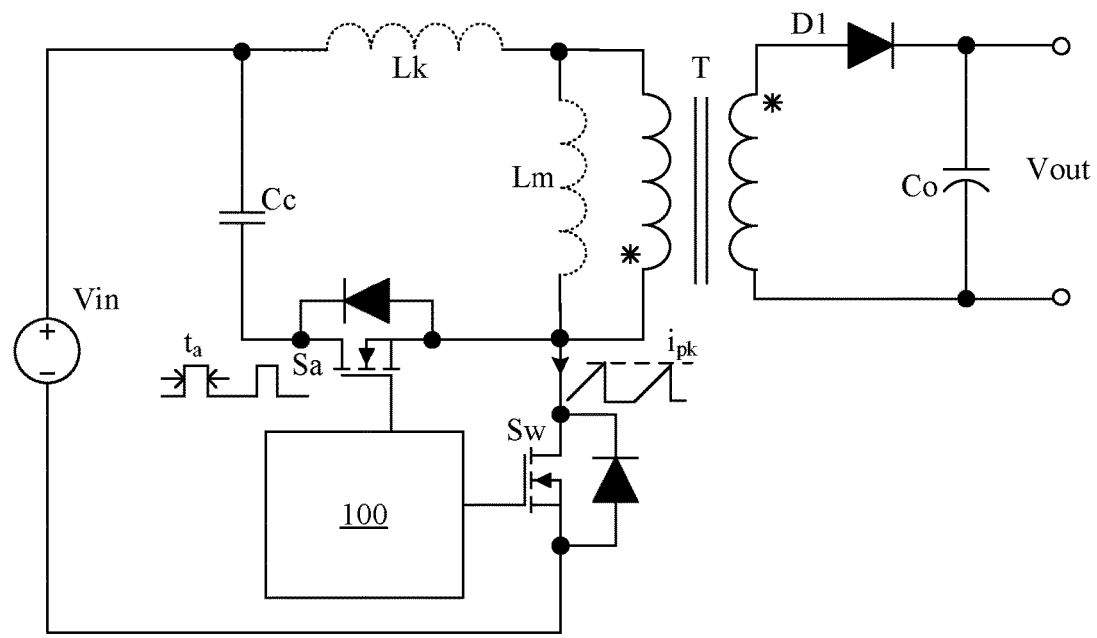
FIG. 1 is a schematic block diagram of a first example flyback converter, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A flyback converter is a power converter that can store energy in a transformer when a switch is turned on, and can transfer energy stored in the transformer to a load when the switch is turned off. The transformer is a main component for energy storage and energy transmission in the flyback converter. When the switch is turned off, a voltage spike can be generated due to leakage inductance of a primary winding of the transformer.

In one example flyback converter, the spike voltage can be absorbed by a clamp control approach. The flyback converter can include a main switch and an auxiliary switch connected to the primary winding of the transformer, where the main switch and the auxiliary switch are alternately turned on and off in a complementary manner. When the main switch is turned off, the auxiliary switch is turned on, forming an additional absorbing circuit to absorb the energy stored in the leakage inductance of the primary winding of the transformer, thus suppressing the spike voltage. Though such clamp control can absorb the voltage spike, the absorbing circuit consumes some energy, thus reducing the efficiency of the flyback converter. Because the main switch and the auxiliary switch are alternately turned on and off in a complementary manner, in light load, the magnetizing inductor current continues to flow, which may cause relatively large circulating energy and peak current of a diode connected to a secondary winding of the transformer, which may result in relatively large diode losses.

In another example flyback converter, the main switch and the auxiliary switch may not be alternately turned on and off in a complementary manner. Before the main switch is turned on, the auxiliary switch can be turned on for a fixed time. This control approach may reduce the on time of the auxiliary switch, thereby reducing the loss in light load. However, the on time of the auxiliary switch is the fixed time, so the circulation current during the conduction of the auxiliary switch is relatively large when the load is reduced to a certain value, which can result in relatively large losses in the auxiliary switch itself. When the switching frequency is high, the loss of the auxiliary switch can be more obvious, which may not be conducive to high frequency operation of the flyback converter.

In particular embodiments, the switch of the flyback converter is a transistor (e.g., a bipolar transistor, a field effect transistor, etc.) that operates in a switching mode in order to provide a current path. The first and second terminals (e.g., source/drain) of the switch are respectively a high electric potential and a low electric potential on the current path, and the control terminal (e.g., gate) can receive a drive signal to control the turn-on and turn-off of the switch.

In one embodiment, an active clamp control circuit for a flyback converter having a main switch configured to provide power energy for a transformer, and an auxiliary switch configured to provide a release path for leakage inductance energy of the transformer, can be configured to: (i) control turn-on states of the main switch and the auxiliary switch to make the auxiliary switch turn on for a first time period in at least one switching period, and to make the main switch turn on for a second time period in each switching period, where the first and second time periods are non-overlapping periods of the switching period; and (ii) compare a peak value of an inductor current flowing through the main switch against a first threshold to adjust the first time period of the auxiliary switch when the peak value of the inductor current is greater than or equal to the first threshold, such that the first time period is directly proportional to the peak value of the inductor current.

In one embodiment, a method of controlling a flyback converter using an active clamp circuit, where the flyback converter includes a main switch configured to provide power energy for a transformer and an auxiliary switch configured to provide a release path for leakage inductance energy of the transformer, can include: (i) controlling the auxiliary switch to be turned on for a first time period in at least one switching period; (ii) controlling the main switch to be turned on for a second time period in each switching period; (iii) detecting a peak value of an inductor current flowing through the main switch; (iv) adjusting the first time period of the auxiliary switch according the peak value of the inductor current flowing through the main switch; and (v) comparing the peak value of the inductor current against a first threshold in order to adjust the first time period of the auxiliary switch when the peak value of the inductor current is greater than or equal to the first threshold, such that the first time period is directly proportional to the peak value of the inductor current.

Referring now to FIG. 1, shown is a schematic block diagram of a first example flyback converter, in accordance with embodiments of the present invention. In this particular example, the flyback converter can include a main circuit, a clamp circuit, and an active clamp control circuit. The main circuit can include transformer T, main switch Sw connected in series with the primary winding of transformer T, diode D1 connected in series with the secondary winding of transformer T, and output capacitor Co. for example, the dotted terminal of the primary winding of transformer T can connect to a first terminal of main switch Sw. An external source can connect between the non-dotted terminal of the primary winding of transformer T and a second terminal of main switch Sw, in order to obtain a direct current input voltage Vin. The dotted terminal of the secondary winding of transformer T can connect to a positive terminal of diode D1, and output capacitor Co can connect between the negative terminal of diode D1 and non-dotted terminal of the secondary winding of transformer T. Direct current output voltage Vout can be provided across output capacitor Co.

The clamp circuit can connect in parallel with the primary winding of transformer T, and may include auxiliary switch Sa and clamp capacitor Cc that are connected in series between two terminals of the primary winding of transformer T. In this example, the primary winding of transformer T can be equivalent to magnetizing inductance Lm and leakage inductance Lk which are connected in series and are respectively shown in dotted lines. Active clamp control circuit 100, respectively connected to main switch Sw and auxiliary switch Sa, can control the turn-on and turn-off states of the two switches. In normal operation, main switch Sw can alternately be turned on and off.

During the turn-on period of main switch Sw, the inductor current may flow through the primary winding of transformer T, and the inductor current may increase with the conduction time of main switch Sw, thus making transformer T store energy. Diode D1 connected to the secondary winding of transformer T may be off due to reverse bias. During the turn-off period of main switch Sw, the inductor current of the primary winding of transformer T may decrease to zero, and diode D1 can conduct due to forward bias. Therefore, transformer T can release energy to supply output capacitor Co and the load. During the turn-off period of main switch Sw, auxiliary switch Sa can be turned on for at least a period of time such that the clamp circuit can start working. The energy stored in leakage inductance Lk of the transformer can be released to clamp capacitor Cc through the body diode of auxiliary switch Sa, thereby suppressing the parasitic oscillation caused by leakage inductance Lk, that is, and suppressing the voltage spike in order to improve electromotive interference (EMI) characteristics.

In this example flyback converter, the turn-on period of auxiliary switch Sa may not be fixed, and the active clamp control circuit can detect the inductor current flowing through main switch Sw, and may adjust the turn-on period and/or turn-on times of auxiliary switch Sa. In one embodiment, the turn-on period of auxiliary switch Sa can be in direct proportion to the peak value of the inductor current. In another embodiment, auxiliary switch Sa can be turned on for a fixed time by internals of a plurality of switching periods. For example, an active clamp control method can utilize the clamp circuit to form an additional absorbing circuit, thus suppressing the voltage spike. Because the turn-on period and/or turn-on times of the auxiliary switch can be reduced, the active clamp control method can reduce the circulating current when the auxiliary switch is turned on, thereby reducing the loss of auxiliary switch. This is conducive to the integration of the auxiliary switch in the chip and the high frequency of the system.

In this example, the active clamp control circuit can compare the peak value of the inductor current against first and second thresholds. For example, when the peak value of the inductor current is greater than or equal to the first threshold, the turn-on period of auxiliary switch Sa may be in direct proportion to the peak value of the inductor current. When the peak value of the inductor current is greater than or equal to the second threshold and less than the first threshold, the turn-on period of auxiliary switch Sa can be a fixed time. Also, when the peak value of the inductor current is less than the second threshold, auxiliary switch Sa can be turned on for a fixed time by internals of the plurality of switching periods. In this way, and active clamp control method can set the turn-on period and/or the turn-on times of auxiliary switch Sa according to the peak value of the inductor current, thereby further improving the effect of suppressing the voltage spike.

Figure 2:
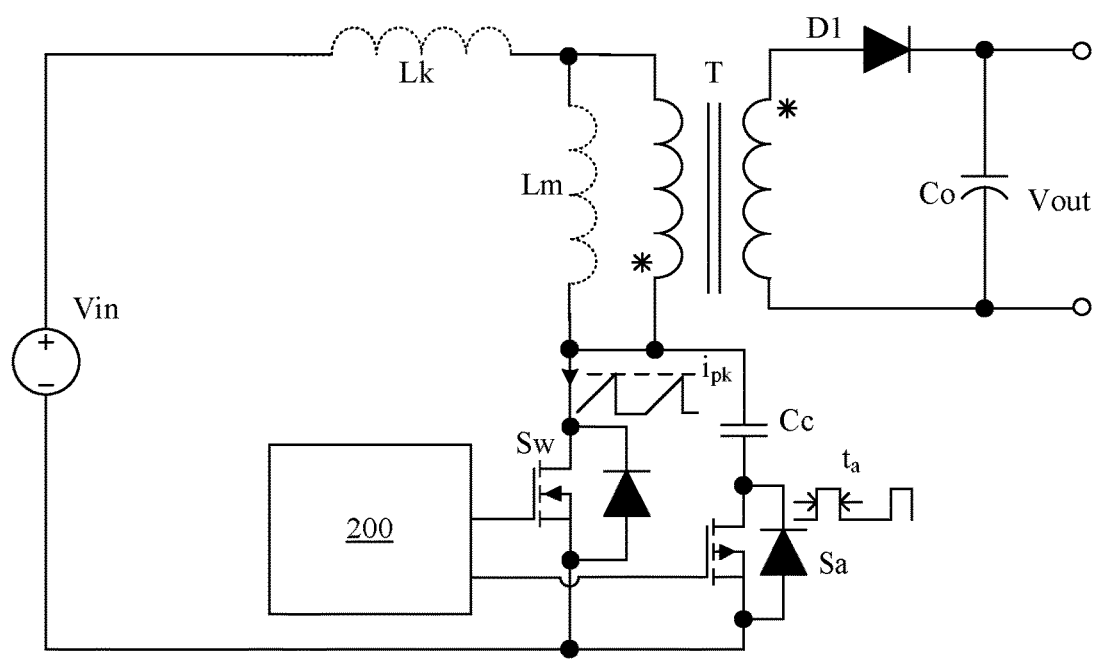
FIG. 2 is a schematic block diagram of a second example flyback converter, in accordance with embodiments of the present invention.

Referring now to FIG. 2, shown is a schematic block diagram of a second example flyback converter, in accordance with embodiments of the present invention. In this particular example, the flyback converter can include a main circuit, a clamp circuit, and an active clamp control circuit. The clamp circuit can connect in series with the primary winding of transformer T, and may include auxiliary switch Sa, and clamp capacitor Cc connected in series between the first and second terminals of main switch Sw. For example, the primary winding of transformer T can be equivalent to magnetizing inductance Lm and leakage inductance Lk which are connected in series and are shown in dotted lines. For example, main switch Sw can be alternately turned on and off. During the turn-off period of main switch Sw, auxiliary Sa can be turned on for at least a period of time such that the clamp circuit can start working. The energy stored in leakage inductance Lk of the transformer can be released to clamp capacitor Cc through the body diode of auxiliary switch Sa, thereby suppressing parasitic oscillation caused by leakage inductance Lk. In this way, the spike voltage may be suppressed in order to improve EMI characteristics.

Figure 3:
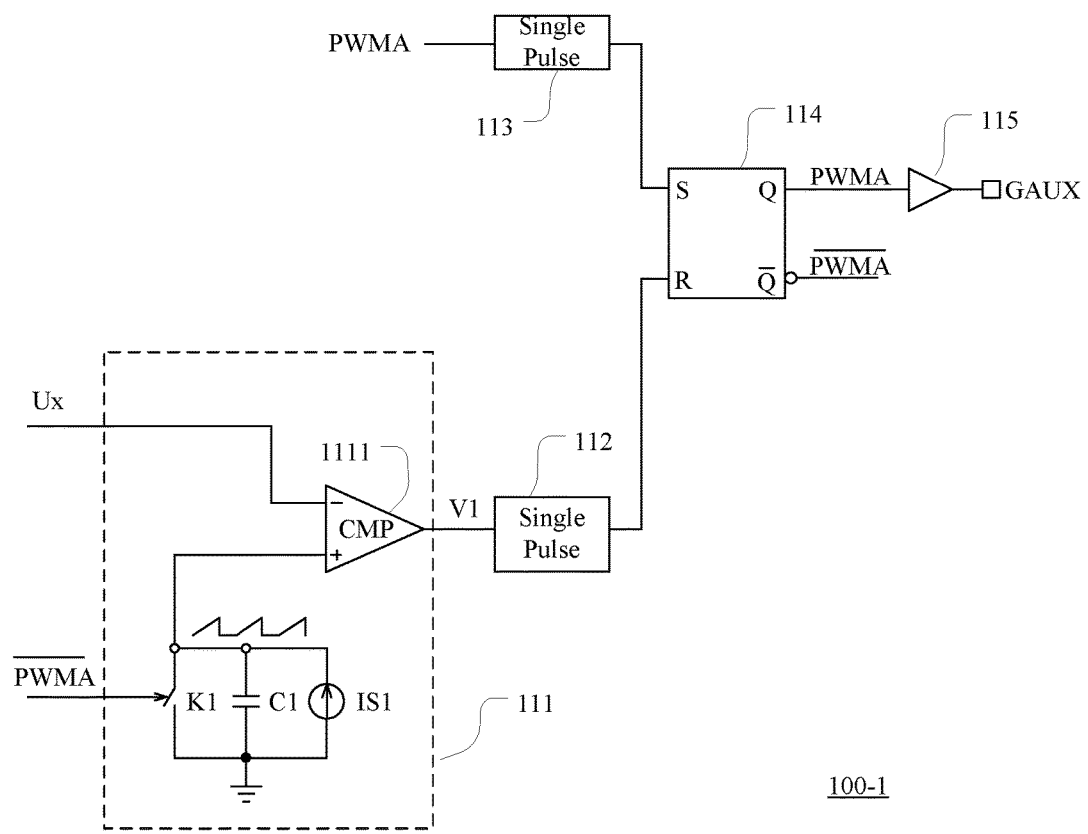
FIG. 3 is a schematic block diagram of an example first circuit of an active clamp control circuit in the flyback converter, in accordance with embodiments of the present invention.

Referring now to FIG. 3, shown is a schematic block diagram of an example first circuit of an active clamp control circuit in the flyback converter, in accordance with embodiments of the present invention. In this particular example, the "first" circuit 100-1 of active clamp control circuit 100 can provide drive signal GAUX for auxiliary switch Sa, and may include a set signal generating circuit, a reset signal generating circuit, a logic circuit, and a drive circuit. The set signal generating circuit can include single pulse generating circuit 113, which can receive pulse width modulation signal PWMA, and may generate a set signal. In one embodiment, single pulse generating circuit 113 can generate a single pulse signal as the set signal when detecting a rising edge or a falling edge of pulse width modulation signal PWMA.

The reset signal generating circuit can include timing circuit 111 and single pulse generating circuit 112. Timing circuit 111 can generate timing signal V1 according to control signal Ux that corresponds to the peak value of the inductor current. Timing signal V1 can characterize the duration of the active state of drive signal GAUX of auxiliary switch Sa in each switching period. That is, timing signal V1 can characterize the turn-on period of auxiliary switch Sa in each switching period. Single pulse generating circuit 112 can receive timing signal V1 and generate a reset signal. In one example, single pulse generating circuit 112 can generate a single pulse signal as the reset signal when detecting a rising edge or a falling edge of timing signal V1.

For example, timing circuit 111 can include comparator 1111, current source IS1, charging capacitor C1, and switch K1. Current source IS1, charging capacitor C1, and switch K1 can connect in parallel between a non-inverting input terminal of comparator 1111 and ground. An inverting input terminal of comparator 1111 can receive control signal Ux corresponding to the peak value of the inductor current. Switch K1 can be controlled according to inverted signal $\overline{PWMA}$ of pulse width modulation signal PWMA. That is, switch K1 can be turned off when auxiliary switch Sa is turned on, and may be turned on when auxiliary switch Sa is turned off. When switch K1 is turned off, charging capacitor C1 can be charged by current source IS1, such that the voltage of the non-inverting input terminal may increase with a predetermined slope. When switch K1 is turned on, charging capacitor C1 can be short circuited to discharge, such that the voltage of the non-inverting input terminal may decrease to zero within a very short time. Thus, after auxiliary switch Sa is turned on, the voltage of the non-inverting input terminal can increase to control signal Ux, making timing signal V1 provided by comparator 1111 transition. The transition of timing signal V1 can characterize the duration of the active state of drive signal GAUX of auxiliary switch Sa, and may achieve the turn-on period corresponding to control signal Ux.

Logic circuit 114 can generate pulse width modulation signal PWMA according to the set and reset signals in order to control auxiliary switch Sa to be turned on and off. Logic circuit 114 can set pulse width modulation signal PWMA to be active according to the set signal, and set pulse width modulation signal PWMA to be inactive according to the reset signal. In this example, the active state of pulse width modulation signal PWMA may refer to a level that can turn on auxiliary switch Sa, and the inactive state of pulse width modulation signal PWMA may refer to a level that can turn off auxiliary switch Sa. For example, logic circuit 114 can be realized by RS trigger. Circuit 100-1 can also include drive circuit 115 that can generate drive signal GAUX according to pulse width modulation signal PWMA. For example, driving signal GAUX is an amplified signal of pulse width modulation signal PWMA.

In this particular example flyback converter, the turn-on period of auxiliary switch Sa may not be fixed, and the active clamp control circuit can detect the inductor current flowing through main switch Sw, and may control the turn-on period of auxiliary switch Sa according to control signal Ux corresponding to the peak value of the inductor current. For example, control signal Ux can be directly proportional to the peak value of the inductor current. Correspondingly, the turn-on period of auxiliary switch Sa can also be in direct proportion to the peak value of the inductor current. For example, an active clamp control method can reduce the circulating current when the auxiliary switch is turned on, thereby reducing the loss of the auxiliary switch. This is conducive to the integration of the auxiliary switch in the chip and the high frequency of the system.

Figure 4:
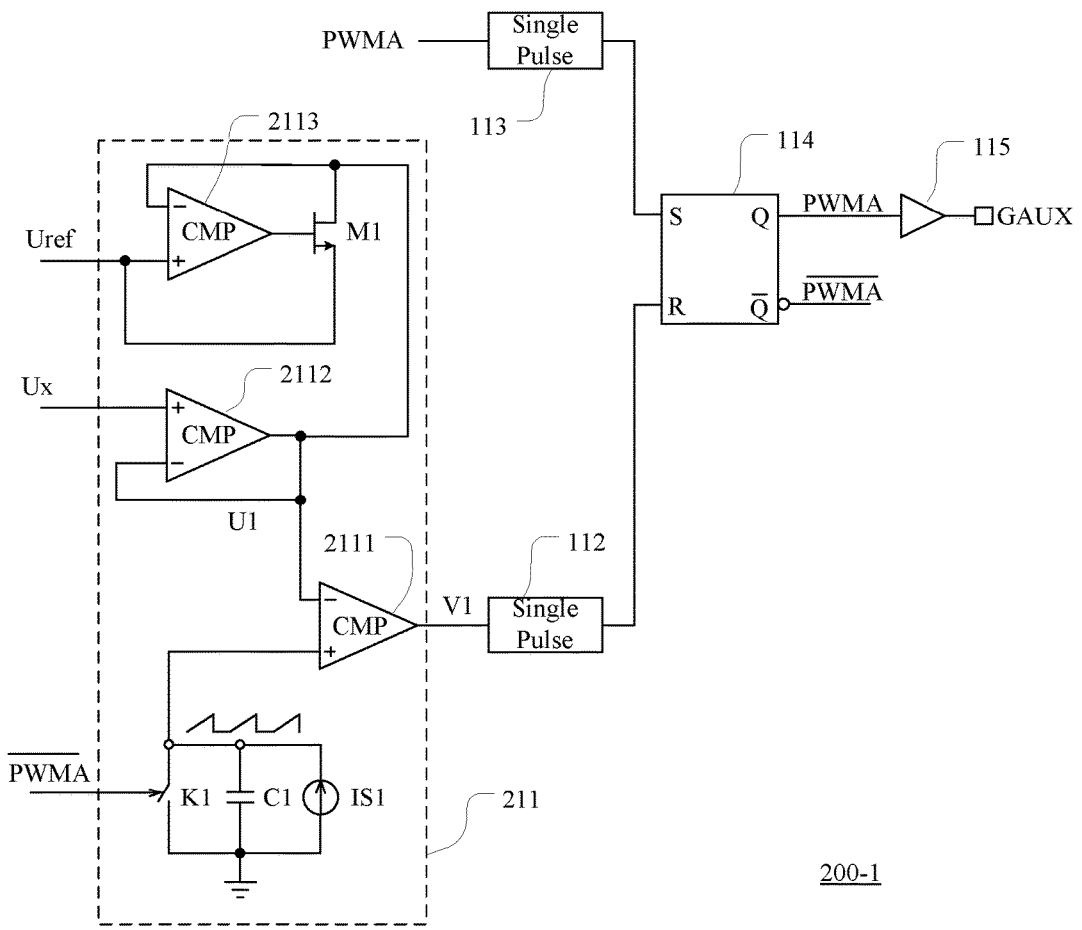
FIG. 4 is a schematic block diagram of another example first circuit of an active clamp control circuit in the flyback converter, in accordance with embodiments of the present invention.

Referring now to FIG. 4, shown is a schematic block diagram of another example first circuit of an active clamp control circuit in the flyback converter, in accordance with embodiments of the present invention. In this particular example, the "first" circuit 200-1 of active clamp control circuit 100 can provide drive signal GAUX for auxiliary switch Sa, and may include a set signal generating circuit, a reset signal generating circuit, a logic circuit, and a drive circuit. The set signal generating circuit can include single pulse generating circuit 113, which can receive pulse width modulation signal PWMA, and may generate a set signal. In one embodiment, single pulse generating circuit 113 can generate a single pulse signal as the set signal when detecting a rising edge or a falling edge of pulse width modulation signal PWMA.

The reset signal generating circuit can include timing circuit 211 and single pulse generating circuit 112. Timing circuit 211 can generate timing signal V1 according to control signal Ux that corresponds to the peak value of the inductor current. Timing signal V1 can characterize the duration of the active state of drive signal GAUX of auxiliary switch Sa in each switching period. That is, timing signal V1 can characterize the turn-on period of auxiliary switch Sa in each switching period. Single pulse generating circuit 112 can receive timing signal V1, and may generate a reset signal. In one example, single pulse generating circuit 112 can generate a single pulse signal as the reset signal when detecting a rising edge or a falling edge of timing signal V1. For example, timing circuit 211 can include comparators 2111 to 2113, switch M1, current source IS1, charging capacitor C1 and switch K1.

A clamp circuit formed by comparators 2112 and 2113 and switch M1 can generate control signal U1 by comparing control signal Ux that is in proportion to the peak value of the inductor current against reference voltage Uref. A non-inverting input terminal of comparator 2112 can receive control signal Ux, an inverting input terminal of comparator 2112 can connect to an output terminal of its own forming a voltage follower, and the output terminal of comparator 2112 can provide control signal U1. A non-inverting input terminal of comparator 2113 can receive reference voltage Uref, an inverting input terminal of comparator 2113 can connect to the output terminal of comparator 2112, and an output terminal of comparator 2113 can connect to a control terminal of switch M1. Also, a first terminal of switch M1 can connect to the output terminal of comparator 2112, and a second terminal of switch M1 can connect to the non-inverting input terminal of comparator 2113.

The inverting input terminal of comparator 2113 can receive control signal U1, which can be compared against reference voltage Uref of the non-inverting input terminal. When control signal Ux that characterizes the peak value of the inductor current is greater than or equal to reference voltage Uref that characterizes the first threshold, the output terminal of comparator 2113 can be a low level, such that switch M1 may be turned off. At this time, control signal U1 of the output terminal of comparator 2112 can be approximately equal to control signal Ux of the non-inverting input terminal of comparator 2112. When control signal Ux that characterizes the peak value of the inductor current is less than reference voltage Uref that characterizes the first threshold, the output terminal of comparator 2113 can be a high level, such that switch M1 may be turned on. At this time, control signal U1 of the output terminal of comparator 2112 can be approximately equal to reference voltage Uref of the non-inverting input terminal of comparator 2113, thereby clamping control signal U1 to reference voltage Uref.

Current source IS1, charging capacitor C1, and switch K1 can connect in parallel between a non-inverting input terminal of comparator 2111 and ground. An inverting terminal of comparator 2111 can receive control signal U1. Switch K1 can be controlled according to inverted signal $\overline{PWMA}$ of pulse width modulation signal PWMA. That is, switch K1 can be turned off when auxiliary switch Sa is turned on, and may be turned on when auxiliary switch Sa is turned off. When switch K1 is turned off, charging capacitor C1 can be charged by current source IS1, such that the voltage of the non-inverting input terminal may increase with a predetermined slope. When switch K1 is turned on, charging capacitor C1 can be short circuited to discharge, such that the voltage of the non-inverting input terminal may decrease to zero within a relatively short time period. Thus, after auxiliary switch Sa is turned on, the voltage of the non-inverting input terminal can increase to control signal U1, making timing signal V1 outputted by comparator 2111 transition. The transition of timing signal V1 can characterize the duration of active state of drive signal GAUX of auxiliary switch Sa, and may achieve the turn-on period corresponding to control signal U1.

Logic circuit 114 can generate pulse width modulation signal PWMA according to the set and reset signals to control auxiliary switch Sa to turned on and off. Logic circuit 114 can set pulse width modulation signal PWMA to be active according to the set signal, and set pulse width modulation signal PWMA to be inactive according to the reset signal. In this example, the active state of pulse width modulation signal PWMA may refer to a level that can turn on auxiliary switch Sa, and the inactive state of pulse width modulation signal PWMA may refer to a level that can turn off auxiliary switch Sa. In this example, logic circuit 114 can be realized by RS trigger. Circuit 200-1 can also include drive circuit 115 that may generate drive signal GAUX according to pulse width modulation signal PWMA, and drive signal GAUX may be an amplified signal of pulse width modulation signal PWMA.

In this particular example flyback converter, the turn-on period of auxiliary switch Sa may not be fixed, and the active clamp control circuit can detect the inductor current flowing through main switch Sw, and may control the turn-on period of auxiliary switch Sa according to control signal Ux corresponding to the peak value of the inductor current. When the peak value of the inductor current is greater than or equal to the first threshold, the turn-on period of auxiliary switch Sa can be in direct proportion to the peak value of the inductor current. When the peak value of the inductor current is less than the first threshold, the turn-on period of auxiliary switch Sa can be a fixed time. For example, active clamp control can reduce the circulating current when the auxiliary switch is turned on, thereby reducing the loss of the auxiliary switch, which can be conducive to the integration of the auxiliary switch in the chip and the high frequency of the system.

Particular embodiments can also include combinations of multiple control methods, and the first circuit of the active clamp control circuit can also include additional comparison circuits to compare control signal Ux against the second threshold. When the peak value of the inductor current is greater than or equal to the first threshold, the turn-on period of auxiliary switch Sa may be in direct proportion to the peak value of the inductor current. When the peak value of the inductor current is greater than or equal to the second threshold and less than the first threshold, the turn-on period of auxiliary switch Sa can be a constant time. When the peak value of the inductor current is less than the second threshold, auxiliary switch Sa can be turned on for a fixed time by internals of the plurality of switching periods. In particular embodiments, active clamp control can also reduce the circulating current and the loss when auxiliary switch is turned on, and may improve the stability of the active clamp control circuit.

Figure 5:
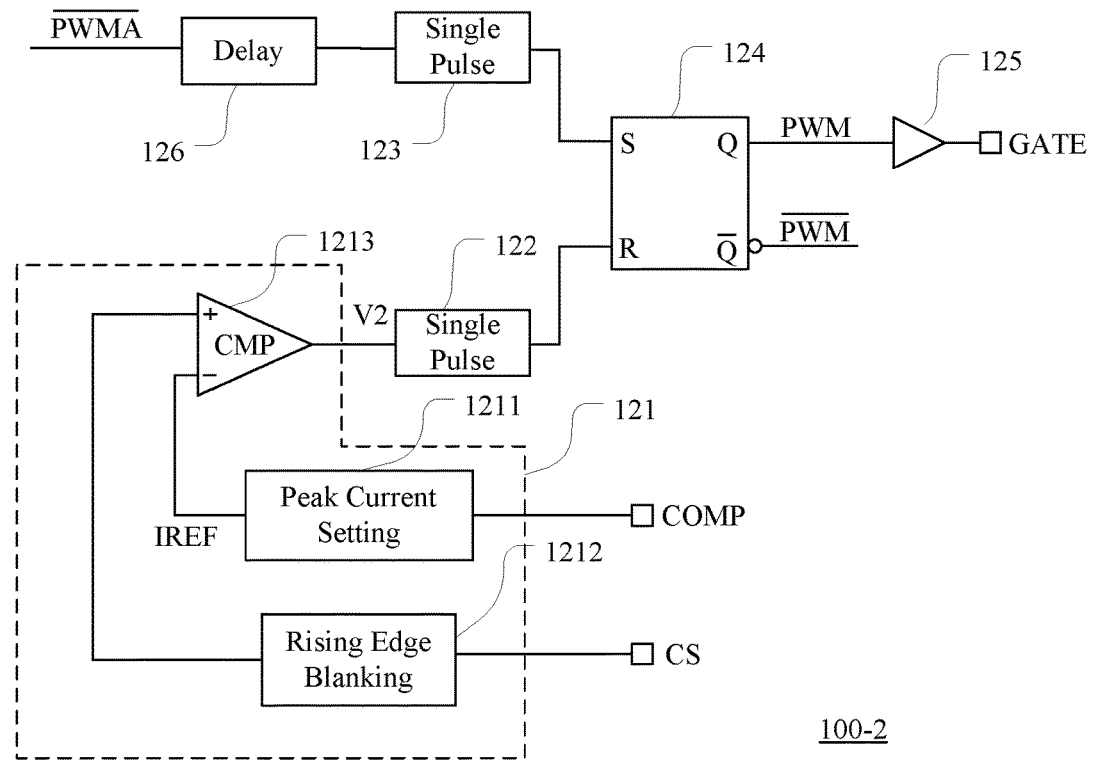
FIG. 5 is a schematic block diagram of an example second circuit of the active clamp control circuit in the flyback converter, in accordance with embodiments of the present invention.

Referring now to FIG. 5, shown is a schematic block diagram of an example second circuit of the active clamp control circuit in the flyback converter, in accordance with embodiments of the present invention. In this particular example, the "second" circuit 100-2 of active clamp control circuit 100 may provide drive signal GATE for main switch Sw, and can include a set signal generating circuit, a reset signal generating circuit, a logic circuit, and a drive circuit. The set signal generating circuit can include single pulse generating circuit 123, which may receive inverted signal $\overline{PWMA}$ of pulse width modulation signal PWMA, and can generate a set signal. In one example, single pulse generating circuit 123 can generate a single pulse signal as the set signal when detecting a rising edge or a falling edge of inverted signal $\overline{PWMA}$ of pulse width modulation signal PWMA.

In this example, circuits 100-1 and 100-2 of active clamp control circuit 100 can apply the same pulse width modulation signal PWMA as the control signal, where circuit 100-1 can turn on auxiliary switch Sa according to pulse width modulation signal PWMA, and circuit 100-2 can turn on auxiliary switch Sa according to inverted signal $\overline{PWMA}$ of pulse width modulation signal PWMA. The set signal generating circuit can also include delay circuit 126, which may insert a dead time after auxiliary switch Sa is turned off and before main switch Sw is turned on. Thus, auxiliary switch Sa and main switch Sw may not be on at the same time.

The reset signal generating circuit can include peak value detection circuit 121 and single pulse generating circuit 122. Peak value detection circuit 121 can generate trigger signal V2 according to current reference signal IREF and current detection signal CS. Trigger signal V2 can characterize the duration of the active state of drive signal GATE of main switch Sw in each switching period. That is, trigger signal V2 can characterize the turn-on period of main switch Sw in each switching period. Single pulse generating circuit 122 can receive trigger signal V2, and may generate a reset signal. In one example, single pulse generating circuit 122 can generate a single pulse signal as the reset signal when detecting a rising edge or a falling edge of trigger signal V2.

For example, peak value detection circuit 121 can include peak current setting circuit 1211, rising edge blanking circuit 1212, and comparator 1213. Peak current setting circuit 1211 can generate current reference signal IREF according to voltage comparison signal COMP, which can characterize the difference between output voltage Vout of the flyback converter and the predetermined reference voltage. Rising edge blanking circuit 1212 can delay current detection signal CS by a predetermined blanking period, such that current detection signal CS can control the turn-on period of main switch Sw after main switch Sw is delayed to be turned on by the predetermined blanking period. An inverting input terminal of comparator 1213 can receive current reference signal IREF, and a non-inverting input terminal of comparator 1213 can receive current detection signal CS through rising edge blanking circuit 1212. After main switch Sw is turned on, the inductor current flowing through main switch Sw can increase with a predetermined slope to reach the value predetermined by current reference signal IREF, thus making trigger signal V2 output by comparator 1213 transition. The transition of trigger signal V2 can characterize the duration of the active state of drive signal GATE of main switch Sw, and may reach the turn-on period that corresponds to the predetermined output voltage Vout.

Logic circuit 124 can generate pulse width modulation signal PWM according to the set and reset signals in order to control main switch Sw to be turned on and off. Logic circuit 124 can set pulse width modulation signal PWM to be active according to the set signal, and set pulse width modulation signal PWM to be inactive according to the reset signal. In this example, the active state of pulse width modulation signal PWM may refer to a level that can turn on main switch Sw, and the inactive state of pulse width modulation signal PWM may refer to a level that can turn off main switch Sw. Logic circuit 124 can be realized by RS trigger, and circuit 100-2 can also include drive circuit 125 that may generate drive signal GATE according to pulse width modulation signal PWM. For example, drive signal GATE is the amplified signal of pulse width modulation signal PWM.

Figure 6A:
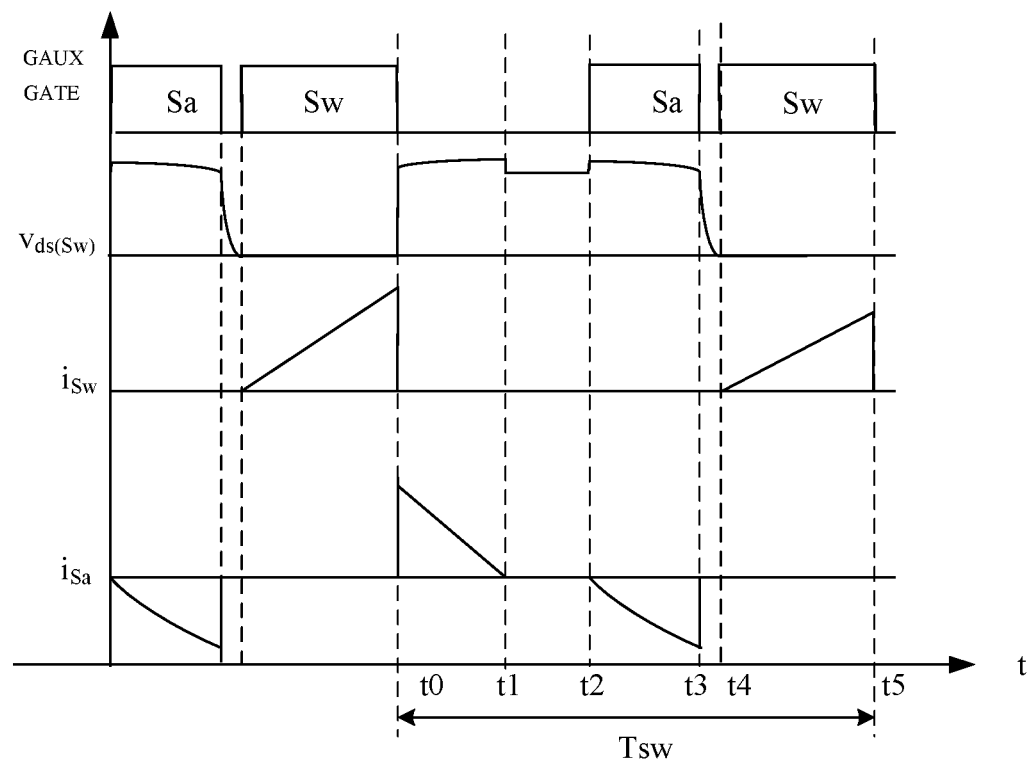
FIGS. 6A and 6B are waveform diagrams of example operation of the flyback converter when a peak value of an inductor current is greater than a first threshold, in accordance with embodiments of the present invention.
Figure 6B:
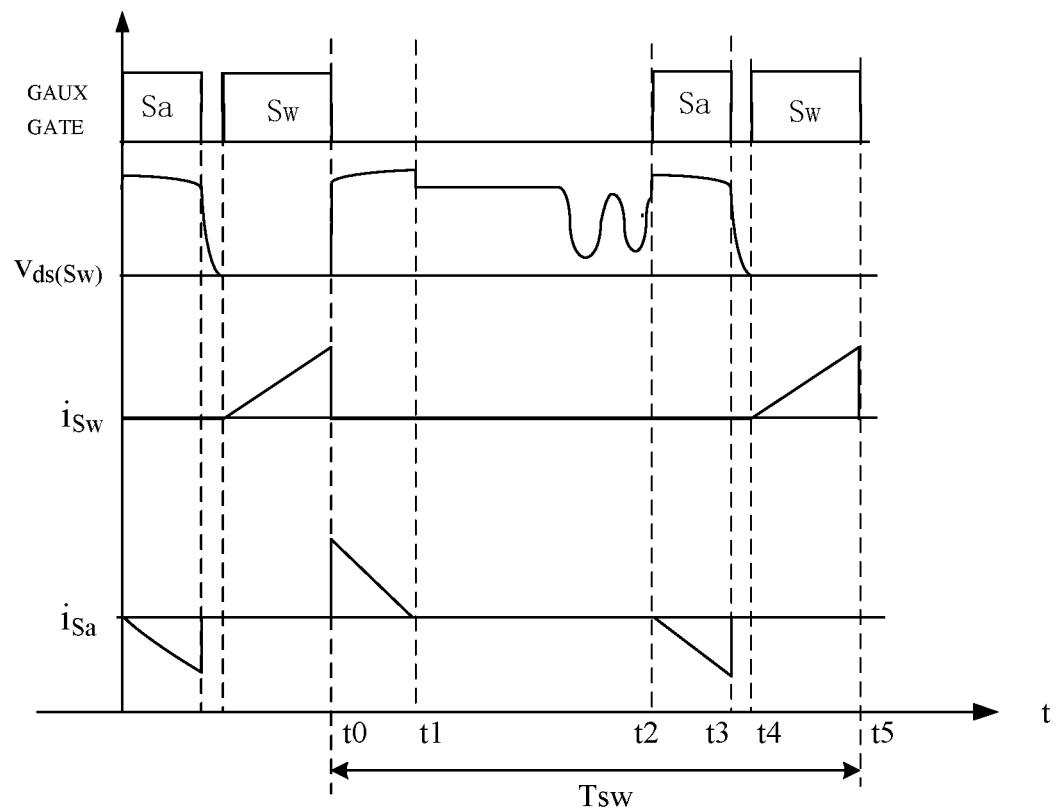

Referring now to FIGS. 6A and 6B, shown are waveform diagrams of example operation of the flyback converter when a peak value of an inductor current is greater than a first threshold, in accordance with embodiments of the present invention. When the peak value of the inductor current is greater than the first threshold, the turn-on period of auxiliary switch Sa may be in direct proportion to the peak value of the inductor current. For example, the flyback converter can apply the active clamp control circuit as shown in FIGS. 3 and 4. In FIGS. 6A and 6B, main switch Sw and auxiliary switch Sa can be turned on and off alternatively in each switching period. However, main switch Sw and auxiliary switch Sa may not operate in a complementary manner in this particular example. Auxiliary switch Sa can be turned on during a portion of the turn-off period of main switch Sw, and the turn-on period of auxiliary switch Sa can be in direct proportion of the peak value of the inductor current flowing through main switch Sw.

In the previous switching period, main switch Sw is turned on, inductor current $i_{SW}$ flowing through main switch Sw continues to increase, and diode D1 may be turned off due to reverse bias. Main switch Sw can be turned off until inductor current $i_{SW}$ reaches a value characterized by current reference signal IREF. Also, during the turn-on period of main switch Sw, the transformer of the flyback converter can store energy. At time t0, main switch Sw may transition from the turn-on state to the turn-off state, and auxiliary switch Sa may maintain the turn-off state, thereby starting a new switching period while ending the previous switching period.

During the turn-off period of main switch Sw, inductor current $i_{SW}$ may continue to decrease, and diode D1 can conduct due to forward bias. Since direct current output voltage Vout is coupled to the primary winding by transformer T, drain-source voltage $V_{ds}$ of main switch Sw may gradually increase with respect to direct current output voltage Vout. Transformer T of the flyback converter can release energy in order to provide power for the output capacitor and the load. At time t1, inductor current $i_{SW}$ flowing through main switch Sw may decrease to zero, and drain-source voltage $V_{ds}$ of main switch Sw can decrease to direct current input voltage Vin. At time t2, auxiliary switch Sa may switch from the turn-off state to the turn-on state, main switch Sw can maintain the turn-off state, and the clamp circuit can be enabled.

During the turn-on period of auxiliary switch Sa, the energy stored in leakage inductance Lk of the transformer can release to clamp capacitor Cc through the body diode of auxiliary switch Sa. Sink current $i_{Sa}$ flowing through auxiliary switch Sa can be in the opposite direction to inductor current $i_{SW}$, and sink current $i_{Sa}$ may gradually increase over time. Since direct current output voltage Vout is coupled to the primary winding by transformer T, drain-source voltage $V_{ds}$ of main switch Sw can initially increase and gradually decrease with respect to direct current input voltage Vin. At time t3, auxiliary switch can be turned off, and the energy stored in leakage inductance Lk of the transformer may release to discharge equivalent parasitic capacitor Cds between the drain and source of main switch Sw, thereby quickly decreasing drain-source voltage $V_{ds}$ of main switch Sw.

At time t4, drain-source voltage $V_{ds}$ of main switch Sw may decrease to zero. At this time, main switch Sw can be turned on, inductor current $i_{SW}$ flowing through main switch Sw can continuously increase, and diode D1 can be turned off due to reverse bias. Main switch Sw can be turned off until inductor current $i_{SW}$ reaches a value characterized by current reference signal IREF. Also, during the turn-on period of main switch Sw, the transformer of the flyback converter can store energy again. In this example, the period from t3 to t4 is the dead time inserted after the turn-on period of auxiliary switch Sa and before the turn-on period of main switch Sw to ensure auxiliary switch Sa and main switch Sw cannot be on at the same time. At time t5, main switch Sw may transition from the turn-on state to the turn-off state, and auxiliary switch Sa can maintain the turn-off state, thereby ending the switching period.

The turn-on periods of auxiliary switch Sa are respectively shown in FIGS. 6A and 6B when the peak value of the inductor current is a first value and a second value correspondingly, where the first value is greater than the second value. The turn-on period of auxiliary switch Sa and the turn-on period of main switch are respectively the first period from t2 to t3, and the second period from t4 to t5. Comparing FIG. 6A with FIG. 6B, it can be seen that the turn-on period of auxiliary switch Sa may reduce with the decrease of the peak value of the inductor current.

Although the turn-on period of main switch Sw shown in FIGS. 6A and 6B may change in proportion to the peak value of the inductor current, according to the operation principles of the active clamp control circuit in FIG. 5, the turn-on period of main switch Sw can be related to both inductor current $i_{SW}$ and current reference signal IREF. In particular embodiments, the clamp circuit of the flyback converter can reduce the circulating current during the turn-on period of auxiliary switch Sa based on the peak value of the inductor current. Correspondingly, the active clamp control circuit of particular embodiments can control the turn-on period of auxiliary switch Sa based on the peak value of the inductor current.

Figure 7:
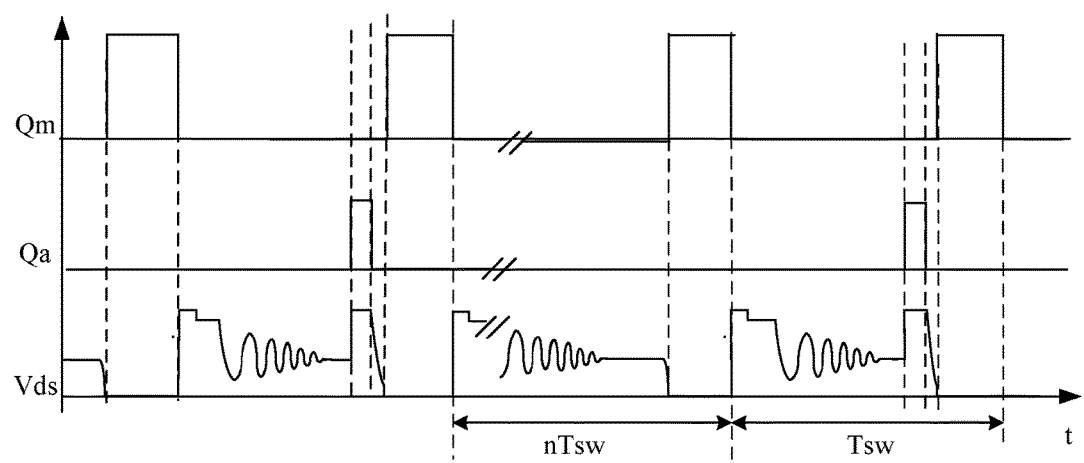
FIG. 7 is a waveform diagram of example operation of the flyback converter when the peak value of the inductor current is less than a second threshold, in accordance with embodiments of the present invention.

Referring now to FIG. 7, shown is a waveform diagram of example operation of the flyback converter when the peak value of the inductor current is less than a second threshold, in accordance with embodiments of the present invention. When the peak value of the inductor current is less than the second threshold, auxiliary switch Sa can be turned on for a fixed period by intervals of a plurality of switching periods. In the continuous "n" switching periods Tsw, main switch Sw can be turned on and off in each switching period, and auxiliary switch Sa can be maintained in a turn-off state. In the following switching period Tsw, main switch Sw and auxiliary switch Sa can alternately be turned on and off, and the turn-on period of auxiliary switch Sa is a fixed time. Auxiliary switch Sa can be turned on by intervals of n switching periods in this approach.

When auxiliary switch Sa is turned on, the clamp circuit can form an additional sink circuit in order to absorb the energy stored in the leakage inductance of the primary winding of the transformer, thereby suppressing the voltage spike. This control approach may be suitable for the control of the flyback under ultra-light load or standby mode. Since the energy stored in the leakage inductance is small under ultra-light load or standby mode, the voltage spike can also be suppressed even if the clamp circuit may start by intervals of a plurality of switching periods. Furthermore, this control approach can further reduce the loss of the auxiliary switch by reducing the turn-on period and turn-on times of the auxiliary switch.

Figure 8:
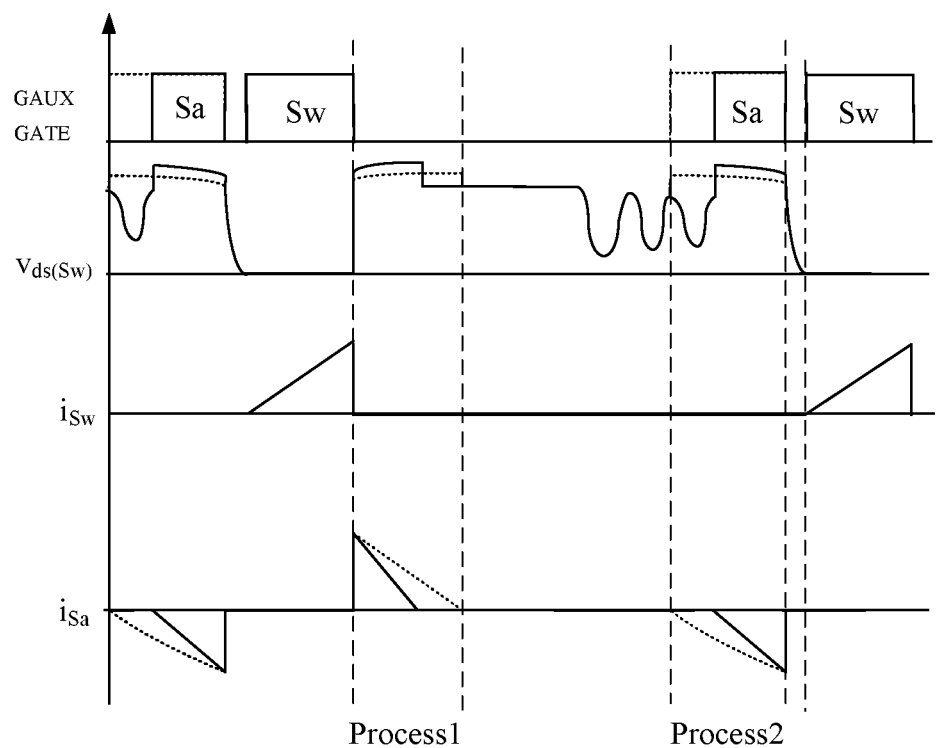
FIG. 8 is a waveform diagram of example operation of the auxiliary switch of the flyback converter under different turn-on periods, in accordance with embodiments of the present invention.

Referring now to FIG. 8, shown is a waveform diagram of example operation of the auxiliary switch of the flyback converter under different turn-on periods, in accordance with embodiments of the present invention. The solid line is the operation waveform when the turn-on period of the auxiliary switch is relatively small, and the dotted line is the operation waveform when the turn-on period of the auxiliary switch is relatively large. The loss of the auxiliary switch can include losses in process 1 and process 2. The loss in process 1 can refer to the loss of the body diode of the auxiliary switch which is turned off after the main switch is turned off. When the auxiliary switch is in the turn-off state, the body diode of the auxiliary switch can be turned on, such that the leakage inductance energy of the transformer can also be transmitted to the clamp capacitor, resulting in the loss. The loss in process 2 is the loss generated when the auxiliary switch is turned on.

Since the value of the clamp capacitor can be selected to be relatively large, the leakage inductance current may be considered as linearly falling or rising during resonance of the leakage inductance of the transformer and the clamp capacitor. Therefore, the clamp capacitor voltage can be approximated as below in Equation (1).

$$Uc = N_{ps} \cdot Vout + \frac{LK \cdot i_{pk}}{T_a}. \quad (1)$$

In Equation (1) above, $N_{ps}$ is the ratio of the primary to secondary side of the transformer, Vout is the output voltage, Lk is the leakage inductance of the transformer, $i_{pk}$ is the peak value of the inductor current, and $T_a$ is the turn-on period of the auxiliary switch. Here, the smaller the turn-on period is, the larger the clamp capacitor voltage Uc can be. Thus, by reducing the turn-on period of the auxiliary switch, the falling period of the current through the body diode of the auxiliary switch can be reduced, thereby reducing the loss of the auxiliary switch. Further, by reducing the turn-on period of the auxiliary switch, the reverse current can be reduced, thereby reducing the loss of the auxiliary switch. Therefore, the auxiliary switch can have a relatively short turn-on period and relatively small loss.

However, the turn-on period of the auxiliary switch may not be as short as possible in some cases. According to the Equation (1), if the turn-on period of the auxiliary switch is reduced, clamp capacitor voltage Uc can increase, resulting in larger voltage stress of the auxiliary switch and the main switch. Therefore, appropriate turn-on period of the auxiliary switch can be selected according to the factors of the loss of the auxiliary switch and the voltage stress of the auxiliary switch and the main switch. In particular embodiments, the turn-on period of the auxiliary switch can be controlled according to the peak value of the inductor current flowing through the main switch such that clamp capacitor voltage Uc is in a reasonable range. For example, when the turn-on period of the auxiliary switch is in direct proportion to the peak current of the main switch, clamp capacitor voltage Uc can remain constant.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An active clamp control circuit for a flyback converter having a main switch configured to provide power energy for a transformer, and an auxiliary switch configured to provide a release path for leakage inductance energy of the transformer, the active clamp control circuit being configured to:

a) control turn-on states of the main switch and the auxiliary switch to make the auxiliary switch turn on for a first time period in at least one switching period according to a peak value of an inductor current and a first pulse-width modulation (PWM) signal, and to make the main switch turn on for a second time period in each switching period, wherein the first and second time periods are non-overlapping periods of the switching period; and b) compare the peak value of the inductor current flowing through the main switch against a first threshold to adjust the first time period during which the auxiliary switch is on when the peak value of the inductor current is greater than or equal to the first threshold, such that the first time period is directly proportional to the peak value of the inductor current.

2. The active clamp control circuit of claim 1, wherein:

a) by comparing the peak value of the inductor current against a second threshold that is less than the first threshold, the active clamp control circuit is configured to adjust the first time period of the auxiliary switch when the peak value of the inductor current is greater than or equal to the second threshold and less than the first threshold such that the first time period a constant time; and b) when the peak value of the inductor current is less than the second threshold, the active clamp control circuit is configured to adjust the first time period of the auxiliary switch, such that the auxiliary switch is turned on for a fixed time by intervals of a plurality of switching periods and maintained in a turn-off state during the plurality of switching periods.

3. The active clamp control circuit of claim 1, wherein the active clamp control circuit comprises a first circuit configured to provide a first drive signal to the auxiliary switch, the first circuit comprising:

a) a first set signal generating circuit configured to generate a first set signal according to the first PWM signal;

b) a first reset signal generating circuit configured to generating a first reset signal according to the peak value of the inductor current;

c) a first logic circuit configured to generate the first PWM signal according to the first set signal and the first reset signal; and d) a first drive circuit configured to generate the first drive signal according to the first PWM signal, wherein the first set signal and the first reset signal respectively characterize a turn-on time and a turn-off time of the auxiliary switch in the switching period, the first time period is a time period between the continuous turn-on time and the turn-off time in the corresponding switching period, and the first time period is adjusted by the first circuit according to the peak value of the inductor current.

4. The active clamp control circuit of claim 3, wherein the first reset signal generating circuit comprises:

a) a timing circuit configured to generate a timing signal according to the peak value of the inductor current; and b) a first single pulse generating circuit configured to generate the first reset signal according to the timing signal.

5. The active clamp control circuit of claim 4, wherein the timing circuit comprises:

a) a first comparator halving non-inverting and inverting input terminals;

b) a current source, a first capacitor, and a first switch that are connected in parallel between the non-inverting input terminal and a ground, wherein the inverting input terminal is configured to receive a control signal corresponding to the peak value of the inductor current;

c) wherein an inverted signal of the first PWM signal is configured to control an on state of the first switch, such that the current source is configured to charge the first capacitor during a turn-on period of the auxiliary switch, and to discharge the first capacitor during a turn-off period of the auxiliary switch; and d) the first comparator is configured to compare a first voltage across the first capacitor against the control signal, such that a transition occurs when the first voltage rises to the control signal, thereby generating the timing signal.

6. The active clamp control circuit of claim 5, wherein the timing circuit further comprises a clamp circuit configured to clamp the peak value of the inductor current to a reference voltage when the control signal corresponding to the peak value of the inductor current is less than the reference voltage.

7. The active clamp control circuit of claim 6, wherein the clamp circuit comprises:

a) a third comparator connected as a voltage follower, wherein a non-inverting input terminal of the third comparator is configured to receive the control signal of the peak value of the inductor current, and an output terminal is connected to the inverting input terminal;

b) a fourth comparator having an inverting input terminal connected to the non-inverting input terminal of the first comparator, and a non-inverting input terminal configured to receive the reference voltage; and c) a clamp switch having a control terminal is connected to an output terminal of the fourth comparator, a first terminal connected to the inverting input terminal of the first comparator, and a second terminal connected to a non-inverting input terminal of its own, wherein when the control signal of the peak value of the inductor current is greater than or equal to the reference voltage, the clamp switch is turned off, and when the control signal of the peak value of the inductor current is less than the reference voltage, the clamp switch is turned on.

8. The active clamp control circuit of claim 3, wherein the active clamp control circuit comprises a second circuit configured to provide a second drive signal for the main switch, the second circuit comprising:

a) a second set signal generating circuit configured to generate a second set signal according to an inverted signal of the first PWM signal;

b) a second reset signal generating circuit configured to generate a second reset signal according to a detection signal of the inductor current and a detection signal of a direct current output voltage of the flyback converter;

c) a second logic circuit configured to generate a second PWM signal according to the second set signal and the second reset signal; and d) a second drive circuit configured to generate the second drive signal according to the second PWM signal, wherein the second set signal and the second reset signal respectively characterize a turn-on time and a turn-off time of the main switch in the switching period, the second time period is a time period between the continuous turn-on time and the turn-off time in the corresponding switching period, and the second circuit is configured to generate a trigger signal when the inductor current rises to a reference current, thereby controlling the second time period.

9. The active clamp control circuit of claim 8, wherein the second reset signal generating circuit comprises:

a) a peak value detection circuit configured to generate the trigger signal according to the detection signal of the inductor current and the detection signal of the direct current output voltage of the flyback converter; and b) a second single pulse generating circuit configured to generate the second reset signal according to the trigger signal.

10. The active clamp control circuit of claim 9, wherein the peak value detection circuit comprises:

a) a peak current setting circuit configured to generate a current reference signal according to the detection signal of the direct current output voltage of the flyback converter to set the reference current;

b) a rising edge blanking circuit configured to delay a predetermined blanking time for the detection signal of the inductor current; and c) a second comparator configured to compare the detection signal of the inductor current with the current reference signal, such that a transition occurs when the inductor current rises to the reference current, thereby generating the trigger signal.

11. The active clamp control circuit of claim 8, wherein the second reset signal generating circuit comprises a delay circuit configured to delay a predetermined time for the inverted signal of the first PWM signal, in order to insert a predetermined dead time between the end of the first time period of the auxiliary switch and the beginning of the second time period of the main switch.

12. The active clamp control circuit of claim 8, wherein each of the first and second set signal generating circuits comprises a single pulse generating circuit.

13. The active clamp control circuit of claim 8, wherein each of the first and second logic circuits comprises an RS flip-flop.

14. A method of controlling a flyback converter using an active clamp circuit, wherein the flyback converter comprises a main switch configured to provide power energy for a transformer and an auxiliary switch configured to provide a release path for leakage inductance energy of the transformer, the method comprising:
   a) detecting a peak value of an inductor current flowing through the main switch;
   b) controlling the auxiliary switch to be turned on for a first time period in at least one switching period according to a peak value of an inductor current and a first pulse-width modulation (PWM) signal;
   c) controlling the main switch to be turned on for a second time period in each switching period;
   d) comparing the peak value of the inductor current against a first threshold in order to adjust the first time period of the auxiliary switch during which the auxiliary switch is on when the peak value of the inductor current is greater than or equal to the first threshold, such that the first time period is directly proportional to the peak value of the inductor current.

15. The method of claim 14, wherein the adjusting the first time period of the auxiliary switch comprises:
   a) comparing the peak value of the inductor current against the second threshold that is less than the first threshold;
   b) adjusting the first time period of the auxiliary switch when the peak value of the inductor current is greater than or equal to the second threshold and less than the first threshold, in order to make the first time period a constant time; and
   c) adjusting the first time period of the auxiliary switch when the peak value of the inductor is less than the second threshold such that the auxiliary switch turned on for a fixed time by intervals of a plurality of switching periods and maintained a turn-off state during the plurality of switching periods.

16. The method of claim 14, wherein the controlling the auxiliary switch to be turned on for a first time period in at least one switching period comprises:
   a) generating a first set signal according to the first PWM signal;
   b) generating a first reset signal according to a detection signal of the peak value of the inductor current;
   c) generating the first PWM signal according to the first set signal and the first reset signal; and
   d) generating a first drive signal according to the first PWM signal, wherein the first set signal and the first reset signal respectively characterize a turn-on time and a turn-off time of the auxiliary switch in the switching period, and the first time period is a time period between the continuous turn-on time and the turn-off time in the corresponding switching period.

17. The method of claim 16, wherein the generating the first reset signal according to the detection signal of the peak value of the inductor current comprises:
   a) generating a timing signal according to the peak value of the inductor current; and
   b) generating the first reset signal according to the timing signal.

18. The method of claim 17, wherein the generating a timing signal according to the peak value of the inductor current comprises:
   a) acquiring a control signal corresponding to the peak value of the inductor current;
   b) charging a first capacitor during a turn-on period of the auxiliary switch;
   c) discharging the first capacitor during a turn-off period of the auxiliary switch; and
   d) comparing a first voltage across the first capacitor against the control signal such that a transition occurs when the first voltage rises to the control signal, thereby generating the timing signal.

19. The method of claim 16, wherein the controlling the main switch to be turned on for a second time period in each switching period comprises:
   a) generating a second set signal according to an inverted signal of the first PWM signal;
   b) generating a second reset signal according to the detection signal of the inductor current and a detection signal of a direct current output voltage of the flyback converter;
   c) generating a second PWM signal according to the second set signal and the second reset signal;
   d) generating a second drive signal according to the second PWM signal, wherein the second set signal and the second reset signal respectively characterize the turn-on time and the turn-off time of the main switch in the switching period, and the second time period is a time period between the continuous turn-on time and the turn-off time in the corresponding switching period; and
   e) generating a trigger signal when the inductor current rises to a reference current, in order to control the second time period.

20. The method of claim 19, wherein the generating the second reset signal comprises:
   a) generating the trigger signal according to the detection signal of the inductor current and the detection signal of the direct current output voltage of the flyback converter; and
   b) generating the second reset signal according to the trigger signal.

* * * * *